(12) United States Patent
Yasusaka (10) Patent No.: US 11,150,677 B2
(45) Date of Patent: Oct. 19, 2021

(54) SERIES REGULATOR

(71) Applicant: ROHM Co., LTD., Kyoto (JP)

(72) Inventor: Makoto Yasusaka, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/936,823

(22) Filed: Jul. 23, 2020

(65) Prior Publication Data

US 2021/0141408 A1    May 13, 2021

(30) Foreign Application Priority Data

Jul. 22, 2019 (JP) ............................. JP2019-134635

(51) Int. Cl.
| | | |
|---|---|---|
| *G05F 1/56* | (2006.01) | |
| *H02H 9/02* | (2006.01) | |
| *G05F 1/573* | (2006.01) | |
| *G05F 1/569* | (2006.01) | |

(52) U.S. Cl.
CPC ................. *G05F 1/56* (2013.01); *H02H 9/02* (2013.01); *G05F 1/569* (2013.01); *G05F 1/573* (2013.01); *H02H 9/025* (2013.01)

(58) Field of Classification Search
CPC ........... G05F 1/569; G05F 1/573; H02H 9/02; H02H 9/025
USPC .................... 323/276, 277, 284; 361/18, 93.9
See application file for complete search history.

(56) References Cited

U.S. PATENT DOCUMENTS

| | | | | |
|---|---|---|---|---|
| 5,491,401 A | * | 2/1996 | Inoue ................. | H03K 17/0826 323/273 |
| 10,003,190 B2 | * | 6/2018 | Simonson ............. | H03K 17/167 |
| 2007/0206338 A1 | * | 9/2007 | Ishino ..................... | G05F 1/575 361/93.9 |
| 2017/0294774 A1 | * | 10/2017 | Illing ..................... | H02H 3/087 |

FOREIGN PATENT DOCUMENTS

JP         2008043086 A        2/2008

\* cited by examiner

*Primary Examiner* — Gary A Nash
(74) *Attorney, Agent, or Firm* — Chip Law Group (57) ABSTRACT

Disclosed are a series regulator and electronic equipment. The series regulator includes a first amplifier that drives a first transistor connected between a power supply and a load, a second amplifier that drives a second transistor connected in parallel to the first transistor, an amplifier control circuit that controls whether or not operation of the first amplifier is possible according to the load, and a first overcurrent protection circuit that limits a first output current flowing in the first transistor to a first overcurrent set value or smaller. The first overcurrent protection circuit carries out variable control of the first overcurrent set value according to a second output current flowing in the second transistor. The electronic equipment includes the series regulator and a load that receives power supply from the series regulator and operates.

10 Claims, 10 Drawing Sheets

SERIES REGULATOR

CROSS REFERENCE TO RELATED APPLICATIONS

This application claims priority benefit of Japanese Patent Application No. JP 2019-134635 filed in the Japan Patent Office on Jul. 22, 2019. Each of the above-referenced applications is hereby incorporated herein by reference in its entirety.

BACKGROUND

The disclosure disclosed in the present specification relates to a series regulator.

In the past, the series regulator (for example, low drop-out (LDO) regulator) generating a desired output voltage from an input voltage by carrying out linear control of the conductivity (on-resistance) of an output transistor connected in series between an input terminal of the input voltage and an output terminal of the output voltage by an operational amplifier has been used widely and generally.

As one example of the related art relating to the above description, Japanese Patent Laid-Open No. 2008-043086 can be cited.

SUMMARY

However, the general series regulator covers the whole region of the load range by using one set of operational amplifier and output transistor. For this reason, it is difficult to implement stable operation in a wide load range, high-speed load response, and reduction in the current consumption.

In view of the above-described problems found out by the inventor of the present application, it is desirable to provide a series regulator that can implement stable operation in a wide load range, high-speed load response, and reduction in the current consumption.

A series regulator disclosed in the present specification has the following configuration (first configuration). The series regulator has a first amplifier that drives a first transistor connected between a power supply and a load, a second amplifier that drives a second transistor connected in parallel to the first transistor, an amplifier control circuit that controls whether or not operation of the first amplifier is possible according to the load, and a first overcurrent protection circuit that limits a first output current flowing in the first transistor to a first overcurrent set value or smaller. The first overcurrent protection circuit carries out variable control of the first overcurrent set value according to a second output current flowing in the second transistor.

In the series regulator formed of the above-described first configuration, it is preferable to employ a configuration (second configuration) in which the first overcurrent protection circuit lowers the first overcurrent set value to a larger extent when the second output current is larger, and raises the first overcurrent set value to a larger extent when the second output current is smaller.

Furthermore, in the series regulator formed of the above-described first or second configuration, it is preferable to employ a configuration (third configuration) in which current capability of the second transistor has power supply dependence or temperature dependence.

Moreover, in the series regulator formed of any of the above-described first to third configurations, it is preferable to employ a configuration (fourth configuration) further having a second overcurrent protection circuit that limits the second output current to a second overcurrent set value or smaller.

Furthermore, in the series regulator formed of the above-described fourth configuration, it is preferable to employ a configuration (fifth configuration) in which the second overcurrent set value has power supply dependence or temperature dependence.

Moreover, in the series regulator formed of any of the above-described first to fifth configurations, it is preferable to employ the following configuration (sixth configuration). The first overcurrent protection circuit includes a sense voltage generating unit that generates a sense voltage according to the first output current, and a drive signal limiting unit that imposes limitation on a drive signal of the first transistor according to a difference value between the sense voltage and an overcurrent set voltage. An offset according to the second output current is given to at least one of the sense voltage and the overcurrent set voltage.

Furthermore, in the series regulator formed of the above-described sixth configuration, it is preferable to employ a configuration (seventh configuration) in which the sense voltage generating unit carries out current/voltage conversion of a total current of a first sense current according to the first output current and a second sense current according to the second output current to generate the sense voltage.

Moreover, in the series regulator formed of any of the above-described first to seventh configurations, it is preferable to employ a configuration (eighth configuration) in which the current capability of the second transistor is lower than current capability of the first transistor and current consumption of the second amplifier is lower than current consumption of the first amplifier.

Furthermore, in the series regulator formed of any of the above-described first to eighth configurations, it is preferable to employ a configuration (ninth configuration) in which the first amplifier and the second amplifier respectively drive the first transistor and the second transistor in such a manner that an output voltage applied to the load corresponds with a target value.

Moreover, electronic equipment disclosed in the present specification has a configuration (tenth configuration) having the series regulator formed of any of the above-described first to ninth configurations and a load that receives power supply from the series regulator and operates.

According to the disclosure disclosed in the present specification, it becomes possible to provide a series regulator that can implement stable operation in a wide load range, high-speed load response, and reduction in the current consumption.

DETAILED DESCRIPTION OF THE PREFERRED EMBODIMENTS

First Embodiment

Figure 1:
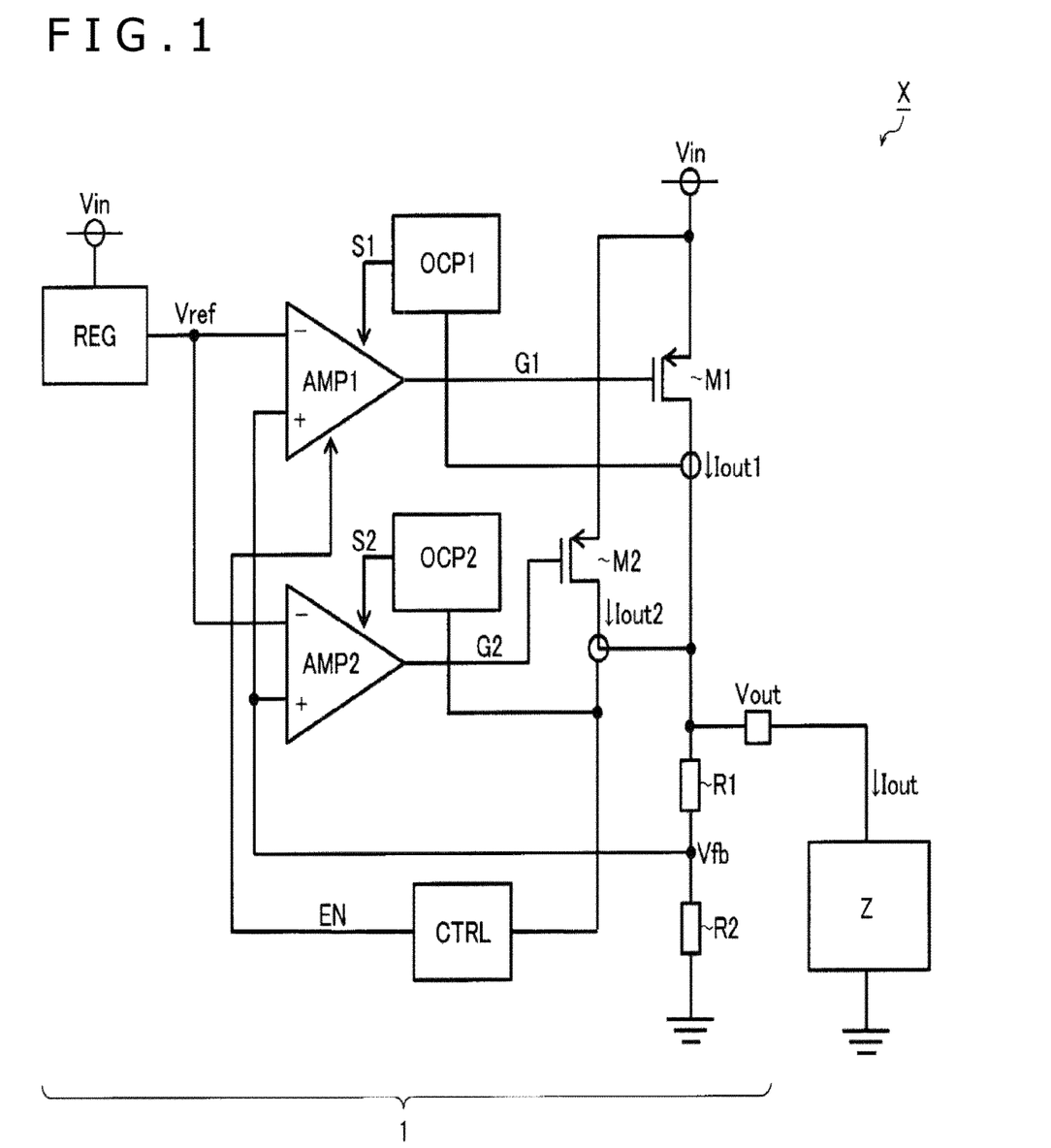
FIG. 1 is a diagram illustrating a first embodiment of a series regulator.

FIG. 1 is a diagram illustrating a first embodiment of a series regulator. Electronic equipment X of this diagram has a series regulator 1 and a load Z that receives power supply from the series regulator 1 and operates.

The series regulator 1 is a semiconductor integrated circuit device (series power supply integrated circuit (IC)) made by integrating P-channel metal oxide semiconductor (MOS) field effect transistors M1 and M2, operational amplifiers AMP1 and AMP2, an amplifier control circuit CTRL, overcurrent protection circuits OCP1 and OCP2, a reference voltage source REG, and resistors R1 and R2. The series regulator 1 generates a desired output voltage Vout (={(R1+R2)/R2}×Vref) from an input voltage Vin and supplies the output voltage Vout to the load Z.

In the integration into the semiconductor integrated circuit device, external discrete components may be used as the transistors M1 and M2 and the resistors R1 and R2.

The transistor M1 is an output transistor for a heavy load. A source of the transistor M1 is connected to a power supply (=input terminal of the input voltage Vin). A drain of the transistor M1 is connected to the load Z (=output terminal of the output voltage Vout). A gate of the transistor M1 is connected to the output terminal of the operational amplifier AMP1 (=output terminal of a gate signal G1). An on-resistance value of the transistor M1 becomes higher when the gate signal G1 is higher, and becomes lower when the gate signal G1 is lower. Therefore, an output current Iout1 that flows in the transistor M1 becomes smaller when the gate signal G1 is higher, and becomes larger when the gate signal G1 is lower.

The transistor M2 is an output transistor for a light load connected in parallel to the transistor M1. Current capability of the transistor M2 is sufficient even when being lower than current capability of the transistor M1. Therefore, a size of the transistor M2 can be designed to be smaller than a size of the transistor M1. A gate of the transistor M2 is connected to the output terminal of the operational amplifier AMP2 (=output terminal of a gate signal G2). An on-resistance value of the transistor M2 becomes higher when the gate signal G2 is higher, and becomes lower when the gate signal G2 is lower. Therefore, an output current Iout2 that flows in the transistor M2 becomes smaller when the gate signal G2 is higher, and becomes larger when the gate signal G2 is lower.

The resistors R1 and R2 are a resistor ladder connected in series between the output terminal of the output voltage Vout and a ground terminal, and a feedback voltage Vfb (={R2/(R1+R2)}×Vout) obtained by dividing the output voltage Vout is output from the connecting node between the resistors R1 and R2.

The operational amplifier AMP1 generates the gate signal G1 (=drive signal of the transistor M1) in such a manner that a reference voltage Vref (=fixed voltage for setting a target value of the output voltage Vout) input to an inverting input terminal (−) corresponds with the feedback voltage Vfb input to a non-inverting input terminal (+) (virtual short). It is enough for the operational amplifier AMP1 to drive only the transistor M1 for a heavy load and therefore circuit design more specialized for high-speed load response and so forth than for reduction in the current consumption can be carried out. That is, the speed of the load response of the operational amplifier AMP1 can be made higher than the load response of the operational amplifier AMP2.

The operational amplifier AMP2 generates the gate signal G2 (=drive signal of the transistor M2) in such a manner that the reference voltage Vref input to an inverting input terminal (−) corresponds with the feedback voltage Vfb input to a non-inverting input terminal (+) (virtual short). It is enough for the operational amplifier AMP2 to drive only the transistor M2 for a light load and therefore circuit design more specialized for reduction in the current consumption and so forth than for high-speed load response can be carried out. That is, the current consumption of the operational amplifier AMP2 can be suppressed to be lower than the current consumption of the operational amplifier AMP1.

The reference voltage source REG is an internal power supply circuit (for example, bandgap power supply circuit) that generates the predetermined reference voltage Vref from the input voltage Vin.

The amplifier control circuit CTRL monitors the output current Iout2, for example, and determines whether the present load region is a light load region in which an output current Iout that flows to the load Z is smaller than a predetermined amplifier switching threshold Ith (Iout<Ith) or is a heavy load region in which the output current Iout is larger than the amplifier switching threshold Ith (Iout>Ith). Furthermore, the amplifier control circuit CTRL generates an enable signal EN for controlling whether or not operation of the operational amplifier AMP1 for a heavy load is possible based on the determination result thereof. Specifically, the amplifier control circuit CTRL generates the enable signal EN in such a manner as to set the operational amplifier AMP1 to a disabled state (=state in which the gate signal G1 is fixed at the high level) in the light load region and set the operational amplifier AMP1 to an enabled state (=state in which high-level fixation of the gate signal G1 is released) in the heavy load region. On the other hand, the operational amplifier AMP2 for a light load does not accept input of the enable signal EN and is set to the enabled state irrespective of the magnitude of the output current Iout.

The overcurrent protection circuit OCP1 controls the operational amplifier AMP1 (and thus gate signal G1) in such a manner that the output current Iout1 flowing in the transistor M1 is limited to an overcurrent set value Iocp1 or smaller.

The overcurrent protection circuit OCP2 controls the operational amplifier AMP2 (and thus gate signal G2) in such a manner that the output current Iout2 flowing in the transistor M2 is limited to an overcurrent set value Iocp2 or smaller.

Figure 2:
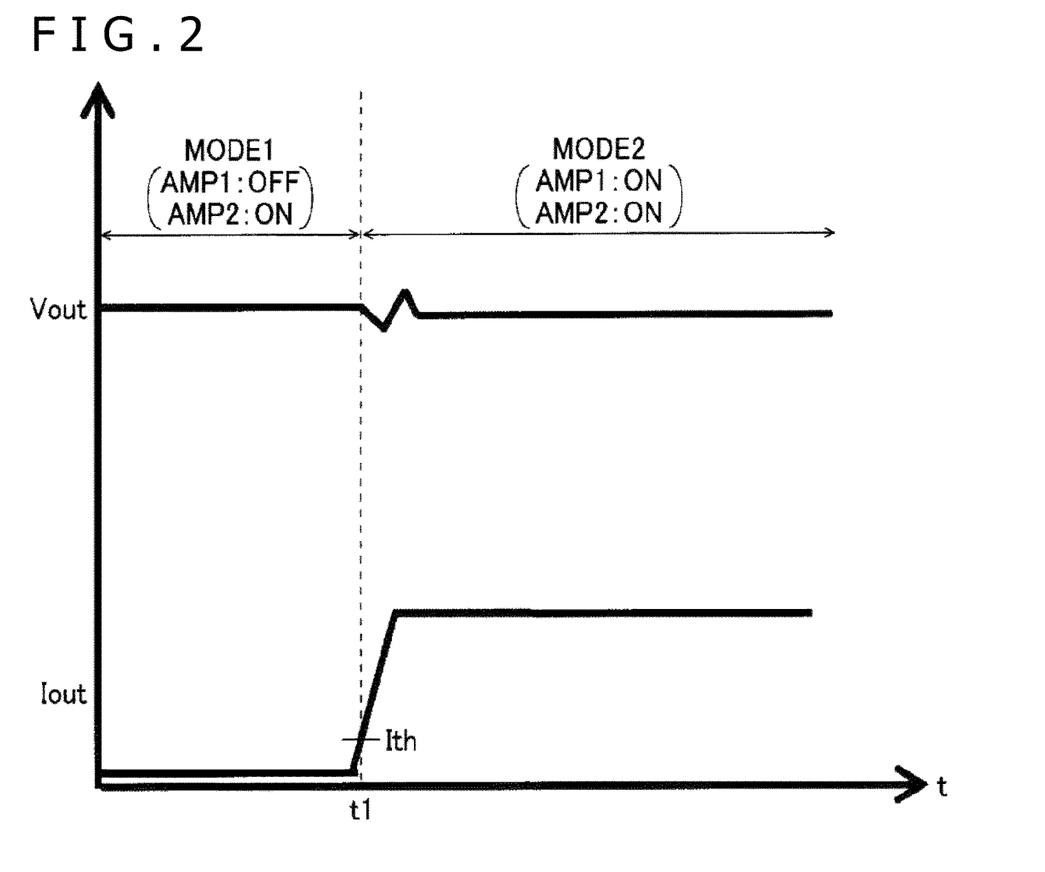
FIG. 2 is a diagram illustrating one example of operation mode switching control.

FIG. 2 is a diagram illustrating one example of operation mode switching control by the amplifier control circuit CTRL, and the output voltage Vout and the output current Iout are depicted in that order from the upper side.

In the light load region (Iout<Ith) before a clock time t1, the operational amplifier AMP1 is set to the disabled state (OFF). Therefore, the transistor M1 is in the off-state and the output current Iout1 flowing in it takes a zero value. On the other hand, the operational amplifier AMP2 is set to the enabled state (ON) also as described above. Therefore, the output current Iout2 flowing in the transistor M2 is the output current Iout itself flowing to the load Z.

On the other hand, in the heavy load region (Iout>Ith) after the clock time t1, the operational amplifier AMP1 is set to the enabled state (ON). As a result, in the transistor M1, the output current Iout1 (=Iout−Iout2) equivalent to a difference obtained by subtracting the output current Iout2 from the output current Iout flows.

As above, with the series regulator 1 (=parallel connection LDO power supply) that individually includes the transistor M1 and the operational amplifier AMP1 for a heavy load and the transistor M2 and the operational amplifier AMP2 for a light load and controls whether or not operation of the operational amplifier AMP1 is possible according to the output current Iout, it becomes possible to achieve both reduction in the current consumption in the light load region (Iout<Ith) and high-speed load response in the heavy load region (Iout>Ith).

However, in the series regulator 1 of the first embodiment, variation in an overcurrent set value Iocp with respect to the output current Iout becomes large. A detailed description will be made below with reference to a drawing.

Figure 3:
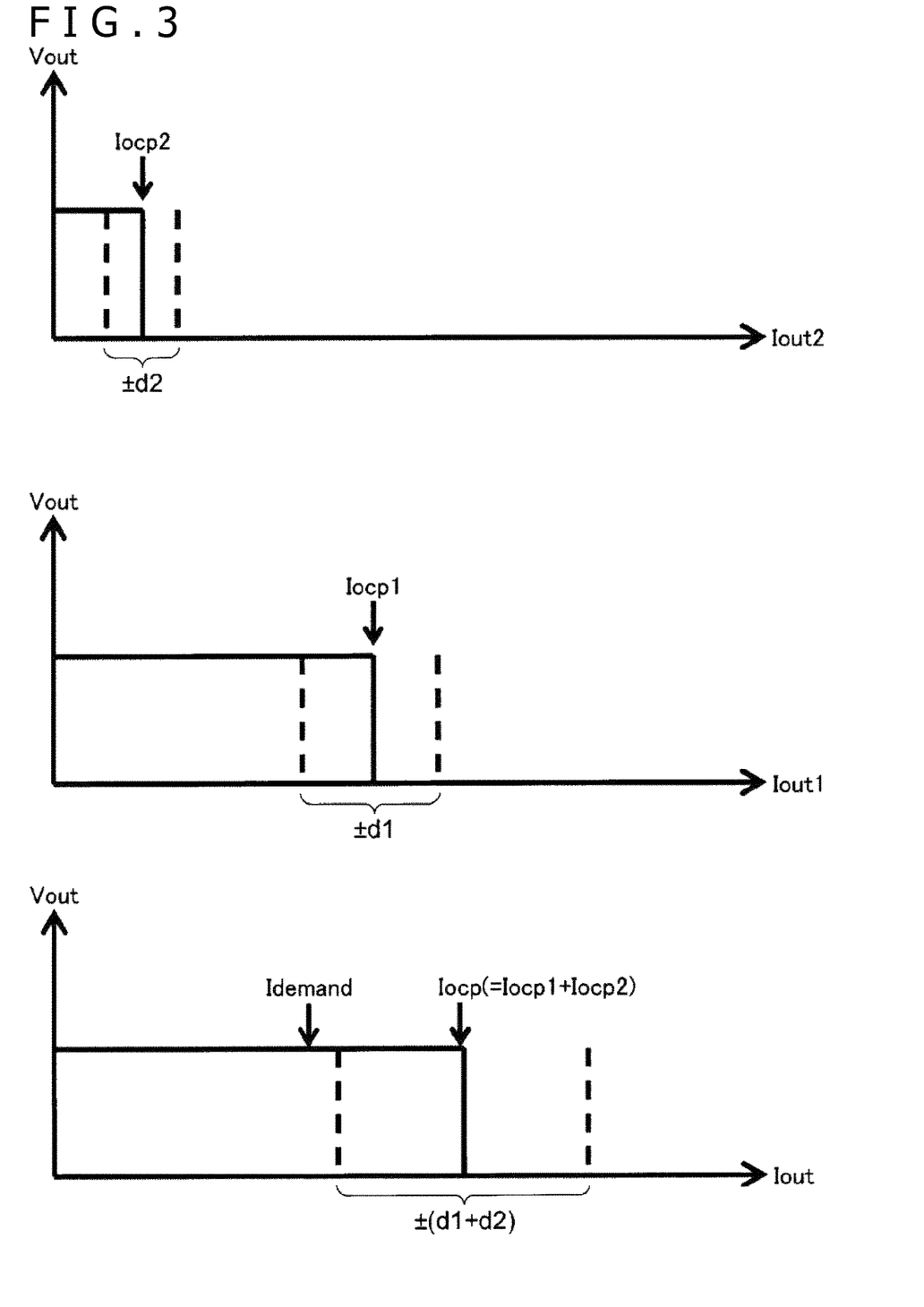
FIG. 3 is a diagram illustrating variation in an overcurrent set value in the first embodiment.

FIG. 3 is a diagram illustrating variation in the overcurrent set value Iocp in the first embodiment, and the overcurrent set value Iocp2 with respect to the output current Iout2, the overcurrent set value Iocp1 with respect to the output current Iout1, and the overcurrent set value Iocp (=Iocp1+Iocp2) with respect to the output current Iout are depicted in that order from the upper side.

As illustrated in FIG. 1 described above, the series regulator 1 has the individual overcurrent protection circuits OCP1 and OCP2 for each of the LDO regulator for a light load (operational amplifier AMP1 and transistor M1) and the LDO regulator for a heavy load (operational amplifier AMP2 and transistor M2).

For this reason, the overcurrent set value Iocp in the whole of the series regulator 1 becomes a total value obtained by adding the overcurrent set value Iocp1 set in the overcurrent protection circuit OCP1 and the overcurrent set value Iocp2 set in the overcurrent protection circuit OCP2 (Iocp1+Iocp2).

Here, the case in which the overcurrent set value Iocp1 has variation±d1 and the overcurrent set value Iocp2 has variation±d2 will be considered. In this case, variation in the overcurrent set value Iocp becomes a total value of the variation±d1 in the overcurrent set value Iocp1 and the variation±d2 in the overcurrent set value Iocp2 (=±(d1+d2)) and therefore the absolute value thereof becomes large (see dashed lines).

In particular, when the overcurrent set values Iocp1 and Iocp2 have power supply dependence or temperature dependence, the respective variations±d1 and ±d2 become larger and therefore the variation±(d1+d2) in the overcurrent set value Iocp, which is the total value of both, also becomes larger.

In the series regulator 1, in order to prevent the overcurrent set value Iocp from falling below demanded current capability Idemand for the series regulator 1 even when the overcurrent set value Iocp varies to the lower side (=in the negative direction toward a smaller value than the original value), the target value of the overcurrent set value Iocp is set higher when the variation±(d1+d2) in the overcurrent set value Iocp is larger. Therefore, when the overcurrent set value Iocp varies to the upper side (=in the positive direction toward a larger value than the original value), the excessive output current Iout is caused to flow without limitation and therefore the safety of the series regulator 1 is impaired.

In view of the above-described consideration, a novel embodiment that can reduce the variation in the overcurrent set value Iocp with respect to the output current Iout will be described below.

Second Embodiment

Figure 4:
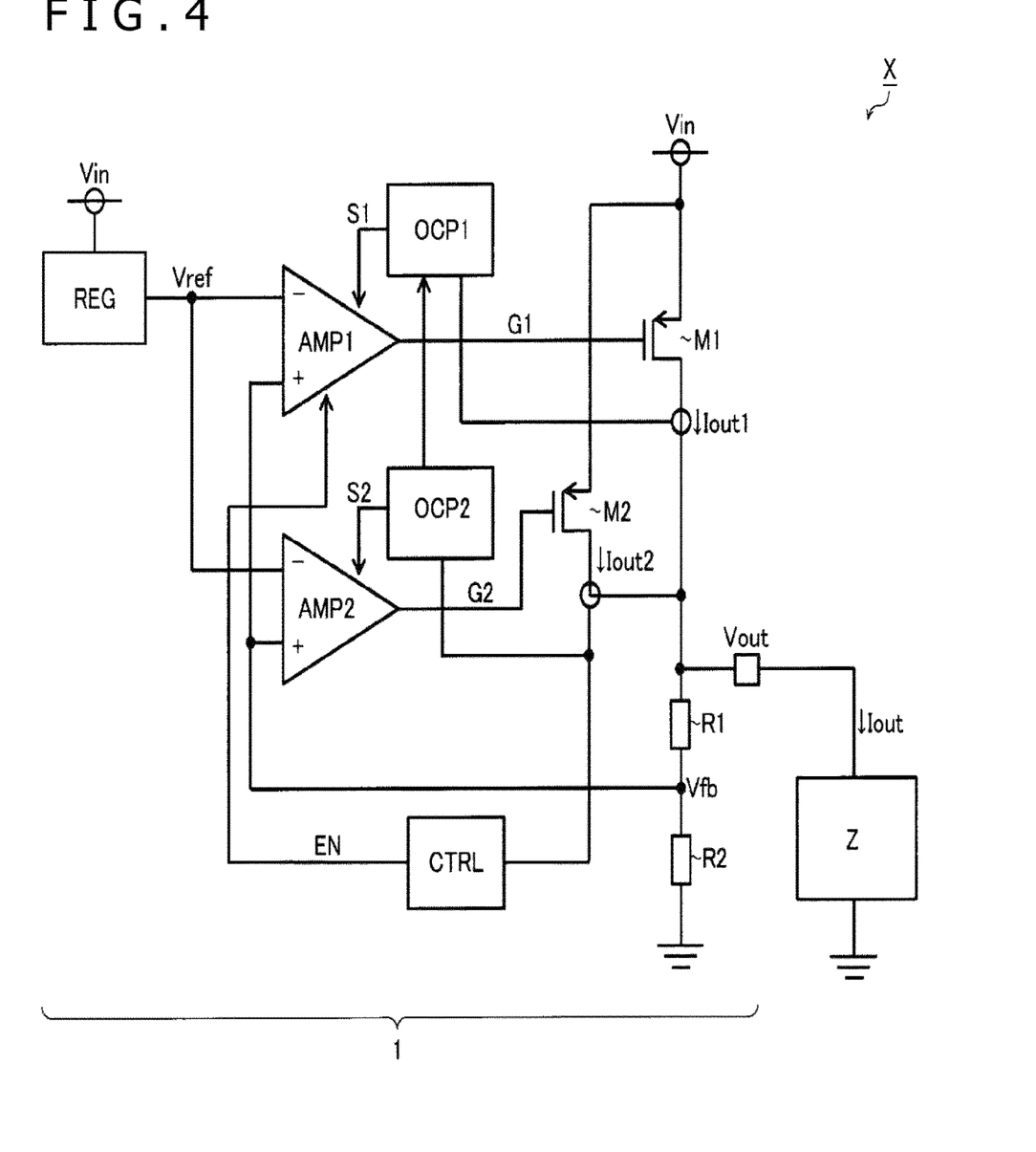
FIG. 4 is a diagram illustrating a second embodiment of the series regulator.

FIG. 4 is a diagram illustrating a second embodiment of the series regulator. The series regulator 1 of the present embodiment is given a configuration that is based on the first embodiment (FIG. 1) and feeds back current information of the LDO regulator for a light load (=magnitude of the output current Iout2) to the overcurrent protection circuit OCP1 of the LDO regulator for a heavy load. Thus, regarding the already-mentioned constituent elements, overlapping description is omitted through giving the same symbols as FIG. 1 thereto, and a description will be made below with focus on a characteristic part of the present embodiment.

The overcurrent protection circuit OCP1 for a heavy load accepts input of information relating to the magnitude of the output current Iout2 through the overcurrent protection circuit OCP2 for a light load and carries out variable control of the overcurrent set value Iocp1 according to the output current Iout2.

Specifically, the overcurrent protection circuit OCP1 lowers the overcurrent set value Iocp1 to a larger extent when the output current Iout2 is larger and conversely raises the overcurrent set value Iocp1 to a larger extent when the output current Iout2 is smaller.

In other words, the overcurrent protection circuit OCP1 lowers the overcurrent set value Iocp1 with respect to the output current Iout1 to the lower side (negative direction) when the overcurrent set value Iocp2 with respect to the output current Iout2 varies to the upper side (positive direction). Conversely, the overcurrent protection circuit OCP1 raises the overcurrent set value Iocp1 with respect to the output current Iout1 to the upper side (positive direction) when the overcurrent set value Iocp2 with respect to the output current Iout2 varies to the lower side (negative direction).

According to the series regulator 1 of the present embodiment, variation in the overcurrent set value Iocp2 can be cancelled out and therefore it becomes possible to reduce variation in the overcurrent set value Iocp in the whole of the series regulator 1.

Third Embodiment

Figure 5:
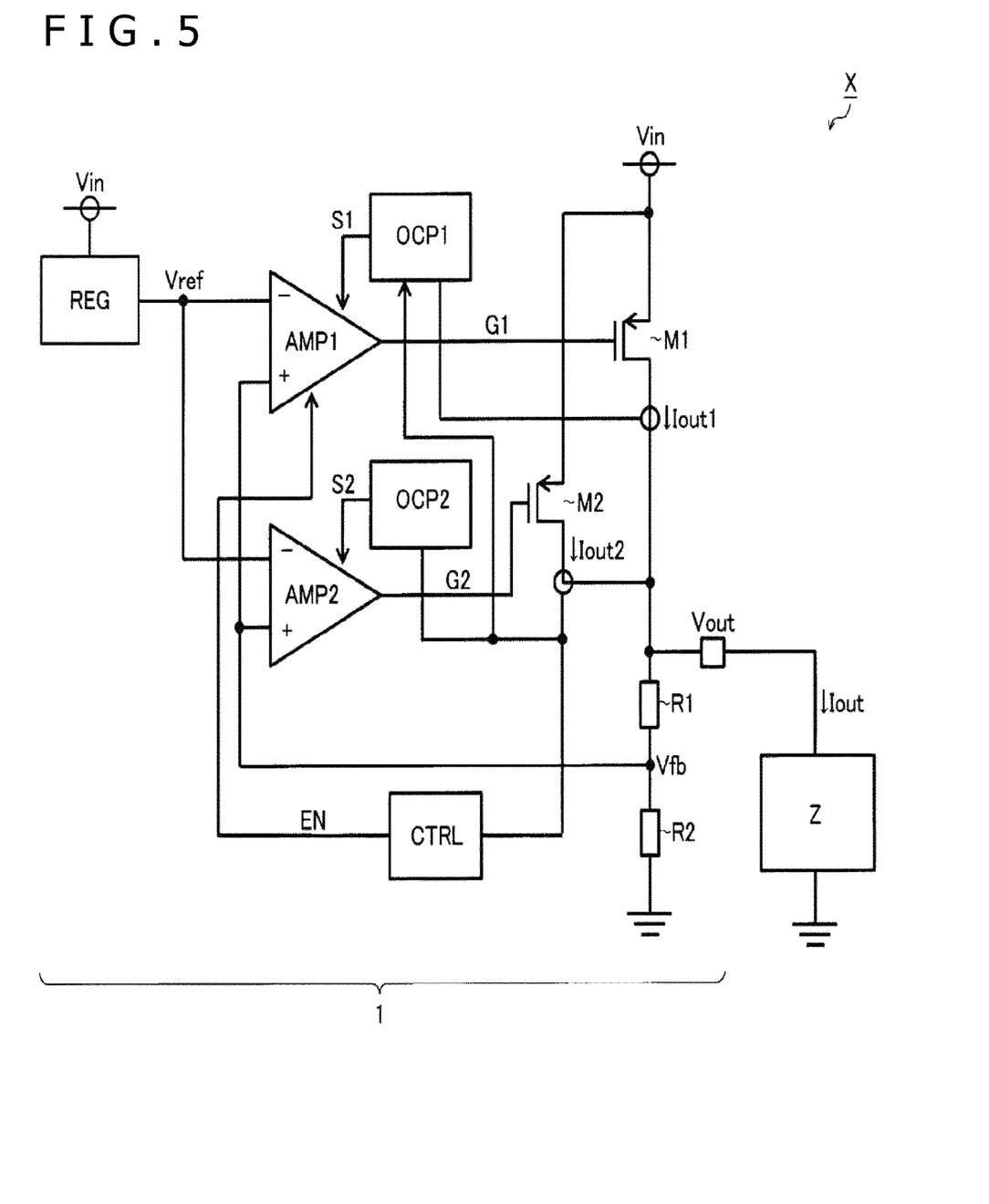
FIG. 5 is a diagram illustrating a third embodiment of the series regulator.

FIG. 5 is a diagram illustrating a third embodiment of the series regulator. The series regulator 1 of the present embodiment is given a configuration that is based on the second embodiment (FIG. 4) and feeds back the current information of the LDO regulator for a light load (=magnitude of the output current Iout2) to the overcurrent protection circuit OCP1 directly without the intervention of the overcurrent protection circuit OCP2.

According to the series regulator 1 of the present embodiment, as with the second embodiment (FIG. 4), variation in the overcurrent set value Iocp2 can be cancelled out and therefore it becomes possible to reduce variation in the overcurrent set value Iocp in the whole of the series regulator 1.

<Reduction in Variation in Overcurrent Set Value>

Figure 6:
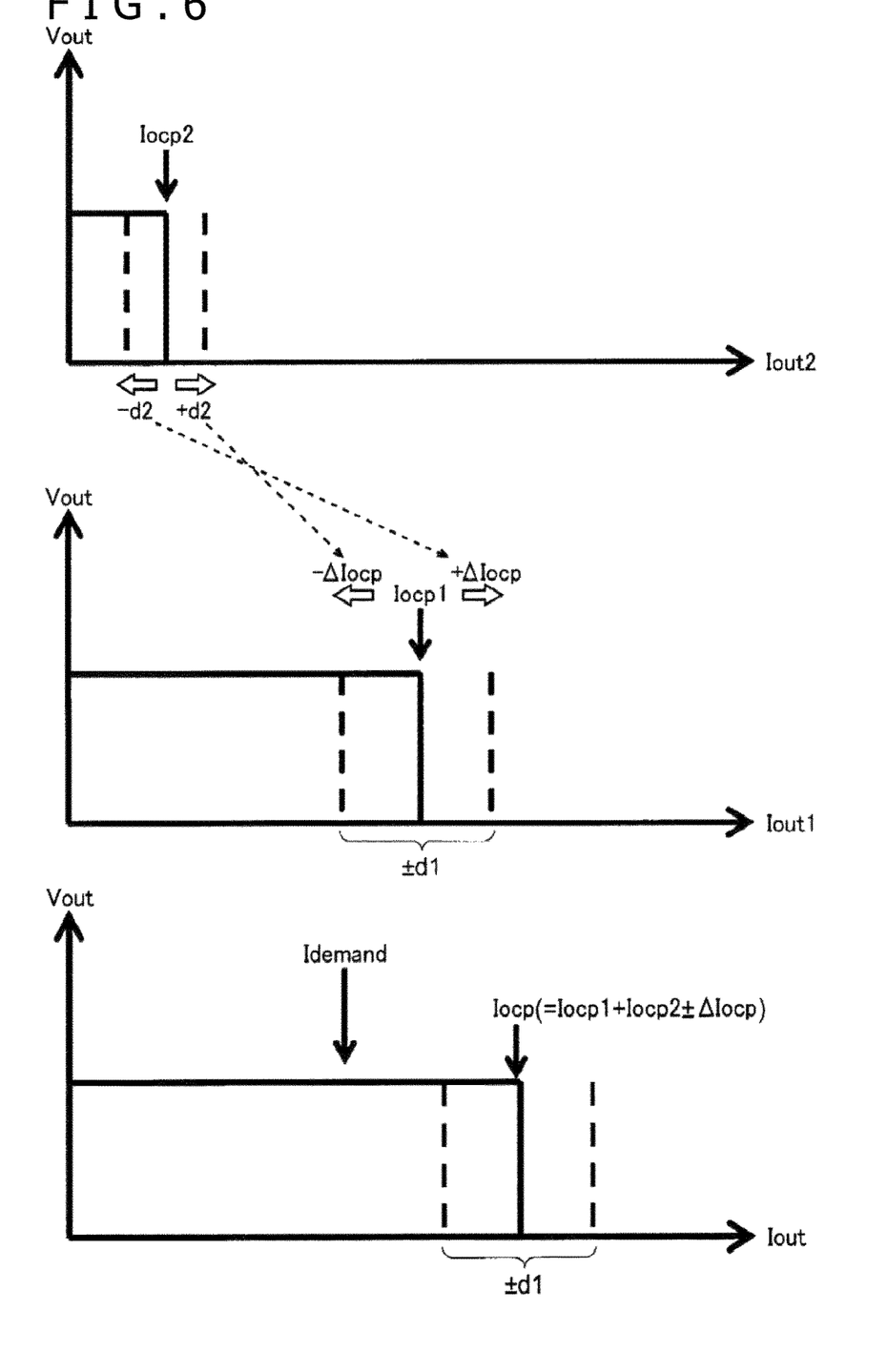
FIG. 6 is a diagram illustrating variation in the overcurrent set value in the second or third embodiment.

FIG. 6 is a diagram illustrating how variation in the overcurrent set value Iocp is reduced in the series regulator 1 of the second or third embodiment (FIG. 4 or FIG. 5), and the overcurrent set value Iocp2 with respect to the output current Iout2, the overcurrent set value Iocp1 with respect to the output current Iout1, and the overcurrent set value Iocp (=Iocp1+Iocp2 ±ΔIocp) with respect to the output current Iout are depicted in that order from the upper side.

As illustrated in this diagram, when the overcurrent set value Iocp2 with respect to the output current Iout2 varies to the upper side (positive direction) by +d2, the overcurrent set value Iocp1 with respect to the output current Iout1 is lowered to the lower side (negative direction) by −ΔIocp (=−d2).

Furthermore, conversely to the above description, when the overcurrent set value Iocp2 with respect to the output current Iout2 varies to the lower side (negative direction) by −d2, the overcurrent set value Iocp1 with respect to the output current Iout1 is raised to the upper side (positive direction) by +ΔIocp (=+d2).

As a result, although the variation±d1 itself in the overcurrent set value Iocp1 does not change, the variation±d2 in the overcurrent set value Iocp2 is cancelled out. Therefore, the variation in the overcurrent set value Iocp can be reduced (see FIG. 3 and FIG. 6 with comparison, ±(d1+d2)→±d1).

When the variation in the overcurrent set value Iocp is small, the target value of the overcurrent set value Iocp does not need to be raised unnecessarily. In other words, the target value of the overcurrent set value Iocp can be set closer to the demanded current capability Idemand of the series regulator 1. Therefore, it becomes possible to apply stricter overcurrent protection and therefore the safety of the series regulator 1 can be improved.

<Consideration Relating to Power Supply Dependence (Temperature Dependence)>

Figure 7:
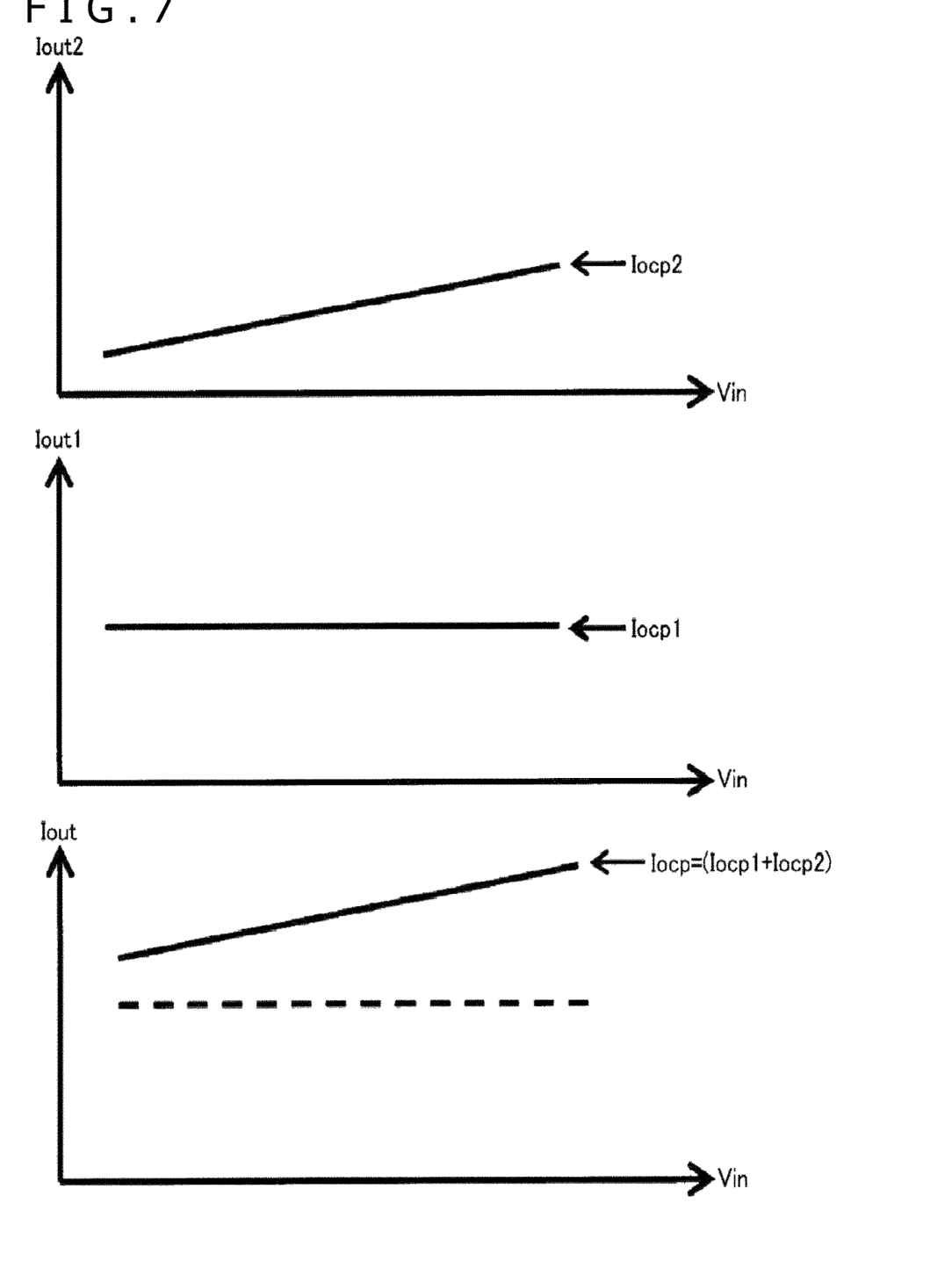
FIG. 7 is a diagram illustrating power supply dependence of the overcurrent set value in the first embodiment.

FIG. 7 is a diagram illustrating the power supply dependence of the overcurrent set value Iocp in the first embodiment (FIG. 1), and the power supply dependence of each of the overcurrent set value Iocp2, the overcurrent set value Iocp1, and the overcurrent set value Iocp is depicted in that order from the upper side. On the lower stage of this diagram, the power supply dependence of the overcurrent set value Iocp1 (dashed line) is depicted in a superimposed manner with the power supply dependence of the overcurrent set value Iocp (solid line).

As illustrated by the upper stage of this diagram, the overcurrent set value Iocp2 becomes larger when the input voltage Vin is higher and conversely becomes smaller when the input voltage Vin is lower. That is, the overcurrent set value Iocp2 has positive power supply dependence.

On the other hand, as illustrated by the middle stage of this diagram, the overcurrent set value Iocp1 has an almost constant value without depending on the input voltage Vin. That is, the overcurrent set value Iocp1 does not have power supply dependence.

Here, the overcurrent set value Iocp in the whole of the series regulator 1 is the total value of the overcurrent set values Iocp1 and Iocp2 (=Iocp1+Iocp2). Therefore, when the overcurrent set value Iocp1 does not have power supply dependence and only the overcurrent set value Iocp2 has power supply dependence, the final overcurrent set value Iocp also has power supply dependence similar to that of the overcurrent set value Iocp2 as illustrated by the lower stage of this diagram.

It is best that the power supply dependence of both of the overcurrent set values Iocp1 and Iocp2 can be made flat. However, priority is given to reduction in the scale and power saving in the overcurrent protection circuit OCP2 for a light load differently from the overcurrent protection circuit OCP1 for a heavy load. For this reason, the overcurrent protection circuit OCP2 is frequently implemented with a simpler circuit configuration than the overcurrent protection circuit OCP1 and it is difficult to make the power supply dependence of the overcurrent protection circuit OCP2 flat.

Figure 8:
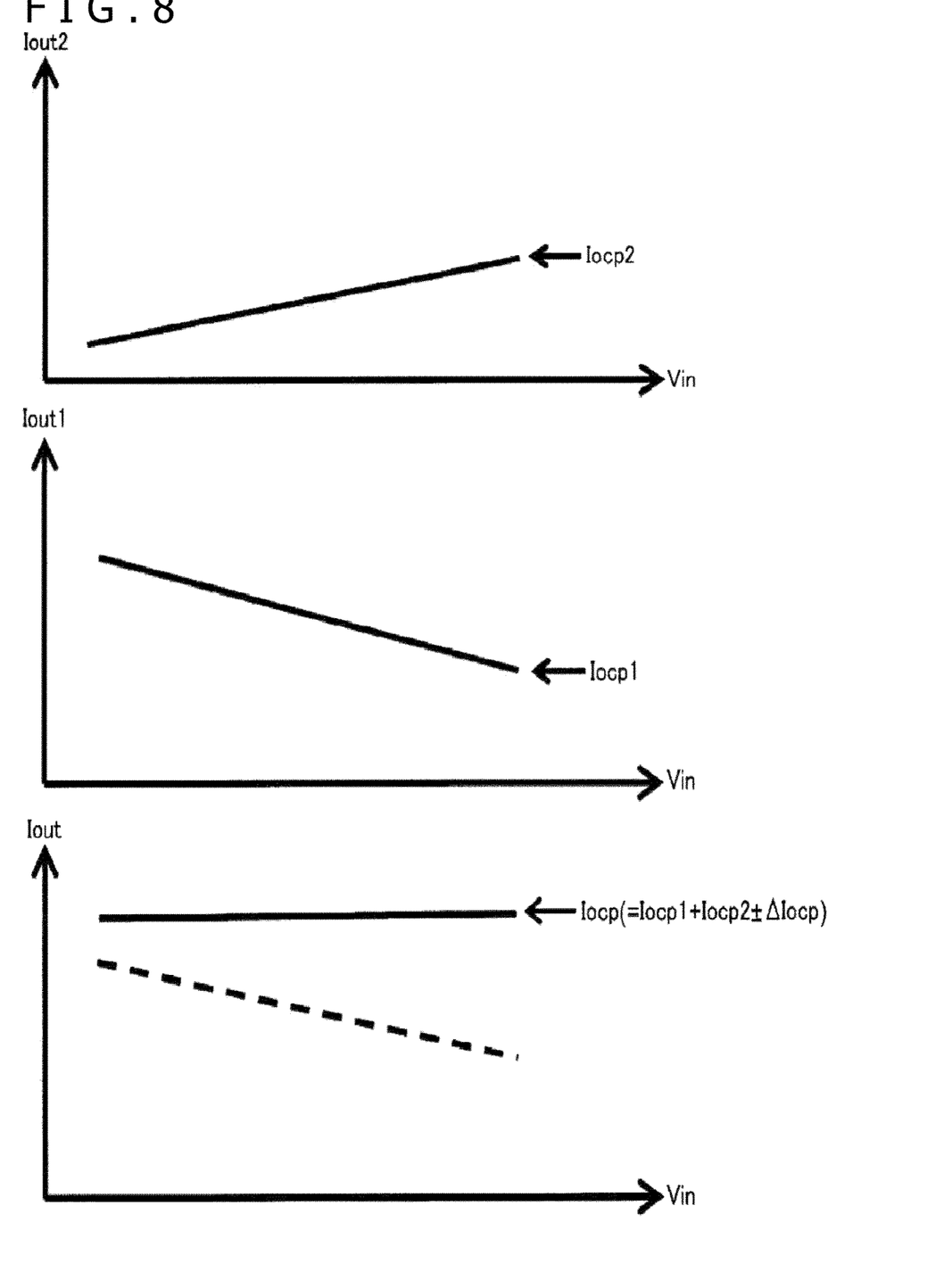
FIG. 8 is a diagram illustrating the power supply dependence of the overcurrent set value in the second or third embodiment.

FIG. 8 is a diagram illustrating the power supply dependence of the overcurrent set value Iocp in the second or third embodiment (FIG. 4 or FIG. 5), and the power supply dependence of each of the overcurrent set value Iocp2, the overcurrent set value Iocp1, and the overcurrent set value Iocp is depicted in that order from the upper side. On the lower stage of this diagram, the power supply dependence of the overcurrent set value Iocp1 (dashed line) is depicted in a superimposed manner with the power supply dependence of the overcurrent set value Iocp (solid line).

As illustrated by the upper stage of this diagram, the overcurrent set value Iocp2 becomes larger when the input voltage Vin is higher and conversely becomes smaller when the input voltage Vin is lower. That is, the overcurrent set value Iocp2 has positive power supply dependence. This point is the same as FIG. 7 described above.

On the other hand, the overcurrent set value Iocp1 does not have power supply dependence originally (see middle stage of FIG. 7). However, due to the feedback control of the output current Iout2 (and thus overcurrent set value Iocp2) described thus far, the overcurrent set value Iocp1 becomes smaller when the overcurrent set value Iocp2 is larger and conversely becomes larger when the overcurrent set value Iocp2 is smaller.

As a result, as illustrated by the middle stage of this diagram, the overcurrent set value Iocp1 becomes smaller when the input voltage Vin is higher and conversely becomes larger when the input voltage Vin is lower. That is, the overcurrent set value Iocp1 has negative power supply dependence in contrast to the overcurrent set value Iocp2.

Here, the overcurrent set value Iocp in the whole of the series regulator 1 is the total value of the overcurrent set values Iocp1 and Iocp2 (=Iocp1+Iocp2) also as described above. Therefore, when the overcurrent set value Iocp1 has negative power supply dependence and the overcurrent set value Iocp2 has positive power supply dependence, the power supply dependences of both cancel out each other and therefore the power supply dependence of the final overcurrent set value Iocp can be reduced as illustrated by the lower stage of this diagram.

Here, the case in which the overcurrent set value Iocp2 has power supply dependence is cited as an example. However, also in the case in which the overcurrent set value Iocp2 has temperature dependence, the temperature dependence of the final overcurrent set value Iocp can be reduced by feedback control similar to the above description. In this case, it suffices that "input voltage Vin" of the abscissa axes of each of FIG. 7 and FIG. 8 is read as "temperature T" and the principle illustrated by these diagrams is understood. Therefore, overlapping description is omitted.

Fourth Embodiment

Figure 9:
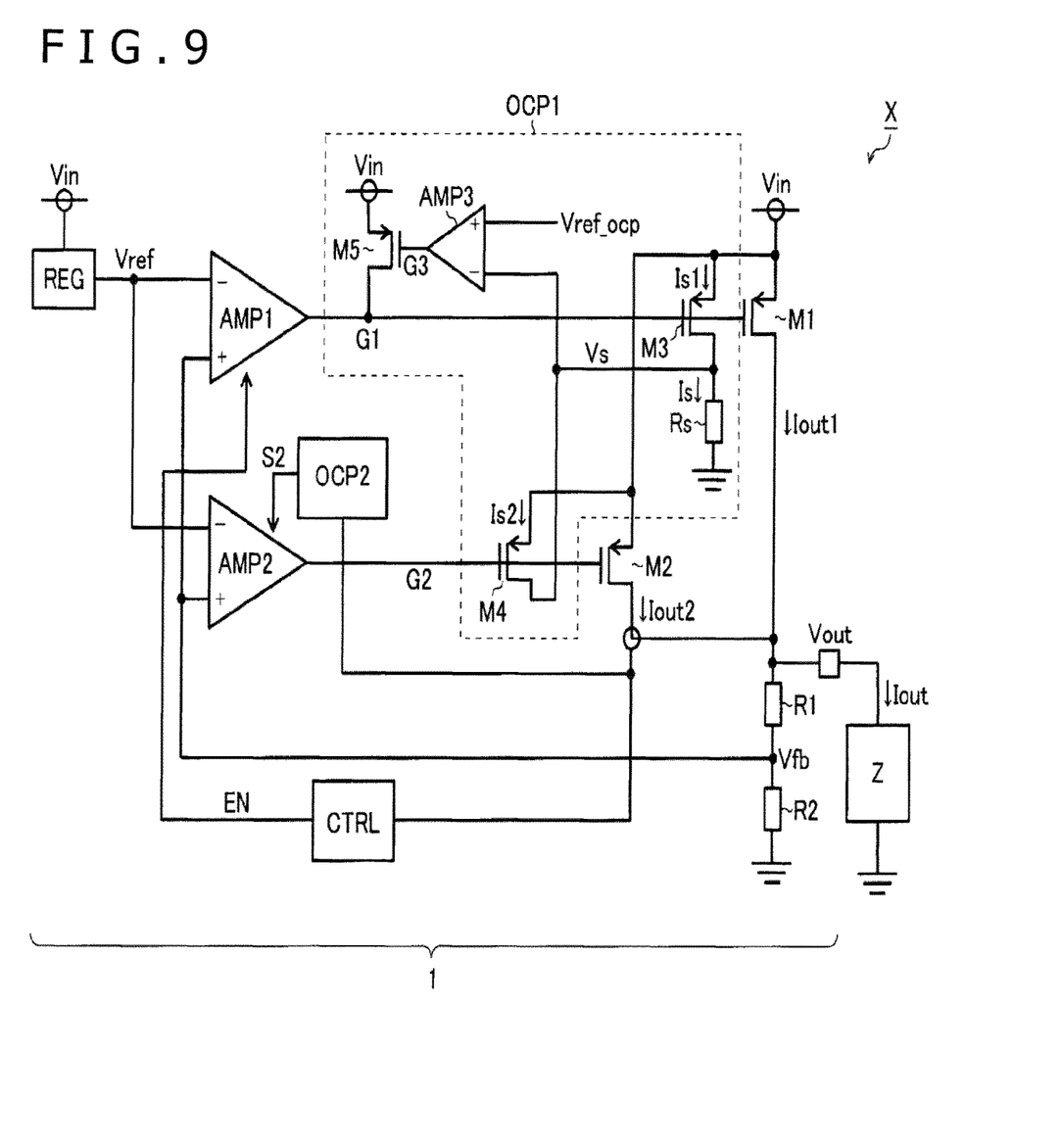
FIG. 9 is a diagram illustrating a fourth embodiment of the series regulator.

FIG. 9 is a diagram illustrating a fourth embodiment of the series regulator. The series regulator 1 of the present embodiment is based on the third embodiment (FIG. 5) and includes an operational amplifier AMP3, P-channel MOS field effect transistors M3 to M5, and a sense resistor Rs as constituent elements of the overcurrent protection circuit OCP1.

A source of the transistor M3 is connected to the source of the transistor M1. A gate of the transistor M3 is connected to the gate of the transistor M1. The transistor M3 connected in this manner functions as a first sense transistor that generates a sense current Is1 (=α×Iout1, where 0<α<1) according to the output current Iout1.

A source of the transistor M4 is connected to the source of the transistor M2. A gate of the transistor M4 is connected to the gate of the transistor M2. The transistor M4 connected in this manner functions as a second sense transistor that generates a sense current Is2 (=β×Iout2, where 0<β<1) according to the output current Iout2.

The sense resistor Rs is connected between the drain of each of the transistors M3 and M4 and a ground terminal and carries out current/voltage conversion of a total sense current Is (=Is1+Is2) obtained by adding the sense currents Is1 and Is2 to generate a sense voltage Vs (=Is×Rs).

In this manner, the transistors M3 and M4 and the sense resistor Rs function as a sense voltage generating unit that generates the sense voltage Vs by generating a voltage signal (=α×Iout1×Rs) according to the output current Iout1 and giving an offset (=β×Iout2×Rs) according to the output current Iout2 to the voltage signal.

The operational amplifier AMP3 generates a gate signal G3 (=drive signal of the transistor M5) in such a manner that the sense voltage Vs input to an inverting input terminal (−) corresponds with an overcurrent set voltage Vref_ocp (=fixed voltage for setting a target value of the overcurrent set value Iocp1) input to a non-inverting input terminal (+) (virtual short).

The transistor M5 is connected between the power supply (=input terminal of the input voltage Vin) and the output terminal of the operational amplifier AMP1 (=output terminal of the gate signal G1) and its on-resistance value is variably controlled according to the gate signal G3. Specifically, the on-resistance value of the transistor M5 becomes higher when the gate signal G3 is higher and becomes lower when the gate signal G3 is lower. Therefore, the gate signal G1 is further pulled up toward the input voltage Vin when the gate signal G3 is lower.

In this manner, the operational amplifier AMP3 and the transistor M5 function as a drive signal limiting unit that imposes limitation on the gate signal G1 (=drive signal of the transistor M1) according to the difference value between the sense voltage Vs and the overcurrent set voltage Vref_ocp.

In the overcurrent protection circuit OCP1 formed of the above-described configuration, the sense voltage Vs is raised to a larger extent when the output current Iout2 (and thus overcurrent set value Iocp2) is larger. Conversely, the sense voltage Vs is lowered to a larger extent when the output current Iout2 is smaller.

When the sense voltage Vs is raised, Vs>Vref_ocp is satisfied even with the smaller output current Iout1 and therefore overcurrent protection is applied more readily. That is, raising the sense voltage Vs is equivalent to lowering the overcurrent set value Iocp1.

Conversely, when the sense voltage Vs is lowered, Vs>Vref_ocp is not satisfied when the larger output current Iout1 is not obtained and therefore overcurrent protection is applied less readily. That is, lowering the sense voltage Vs is equivalent to raising the overcurrent set value Iocp1.

As above, according to the series regulator 1 of the present embodiment, it becomes possible to feed back the current information of the LDO regulator for a light load (=magnitude of the output current Iout2) to the overcurrent protection circuit OCP1 of the LDO regulator for a heavy load, with an extremely-simple circuit configuration.

The circuit configuration of the overcurrent protection circuit OCP1 is not limited to the above description at all and various modifications are possible. For example, the offset according to the output current Iout2 may be subtracted from the overcurrent set voltage Vref_ocp instead of being added to the sense voltage Vs.

Fifth Embodiment

Figure 10:
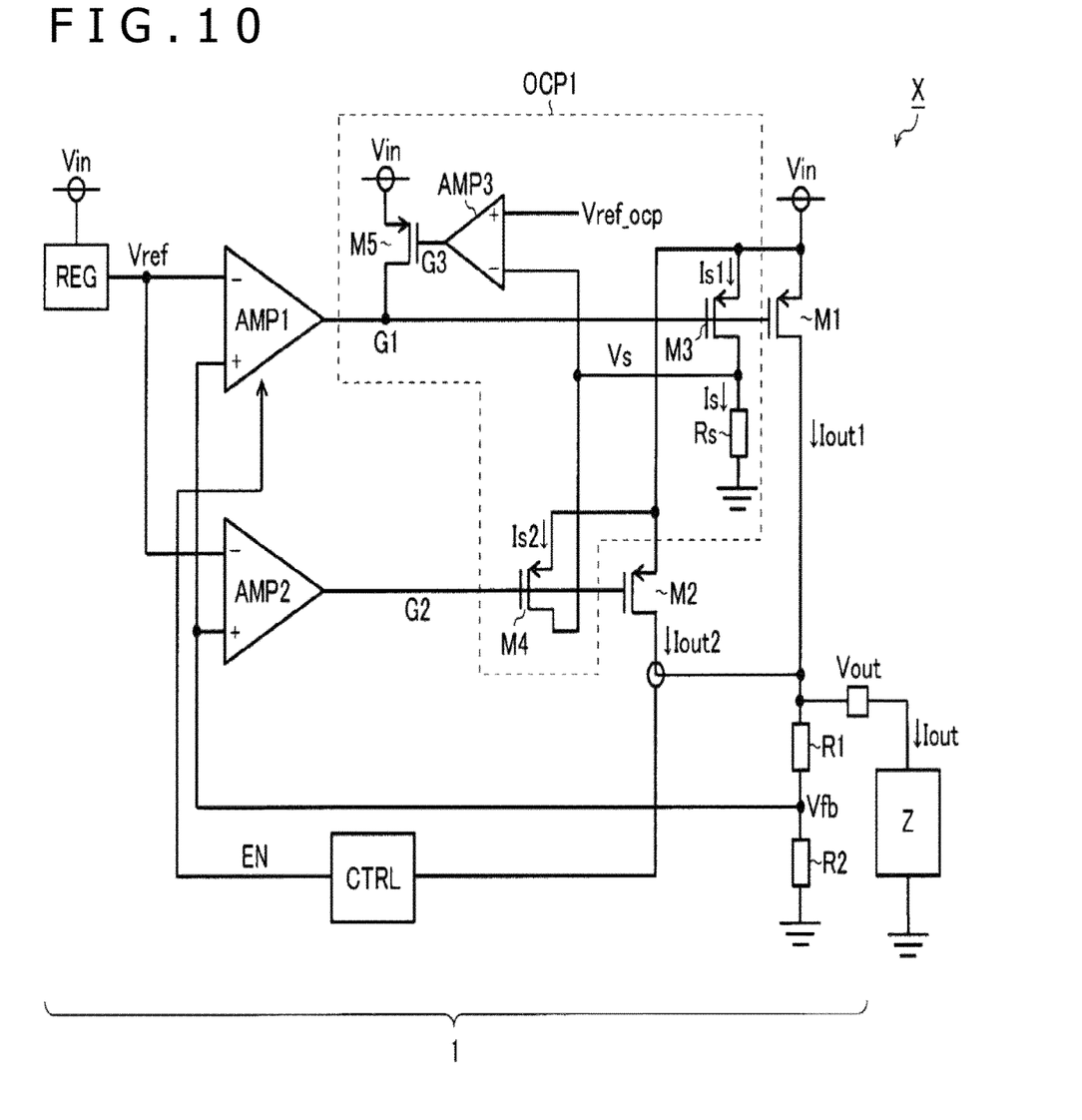
FIG. 10 is a diagram illustrating a fifth embodiment of the series regulator.

FIG. 10 is a diagram illustrating a fifth embodiment of the series regulator. The series regulator 1 of the present embodiment is based on the fourth embodiment (FIG. 9) and the overcurrent protection circuit OCP2 is omitted therefrom.

In the transistor M2 for a light load, its element size is small and the current capability is also low. Therefore, the case in which the overcurrent protection circuit OCP2 is not set as in the present embodiment is also conceivable. In this case, "variation in the overcurrent set value Iocp2," which is deemed as a problem thus far, does not exist.

However, even without the overcurrent protection circuit OCP2, the output current Iout2 is limited to the current capability of the transistor M2 or lower by itself. Furthermore, the current capability of the transistor M2 generally has variation of power supply dependence, temperature dependence, and so forth. Therefore, this variation possibly becomes a cause of increasing variation in the overcurrent set value Iocp in the whole of the series regulator 1.

In view of this, to reduce the variation in the final overcurrent set value Iocp, it is effective to employ a configuration that feeds back the current information of the LDO regulator for a light load (=magnitude of the output current Iout2) to the overcurrent protection circuit OCP1 of the LDO regulator for a heavy load as described thus far irrespective of whether or not the overcurrent protection circuit OCP2 exists.

OTHER MODIFICATION EXAMPLES

Besides the above-described embodiments, various changes can be added to various technical characteristics disclosed in the present specification without departing from the gist of technical creation thereof. For example, mutual replacement of bipolar transistors and MOS field effect transistors and logic level inversion of various signals are optional. That is, the above-described embodiments are exemplification in all points and should be considered not to be what are restrictive, and it should be understood that the technical range of the present disclosure is not limited to the above-described embodiments and all changes that belong to meanings and range equivalent to the scope of claims are included therein.

The series regulators disclosed in the present specification can be used as a power supply mechanism for various applications.

What is claimed is:

1. A series regulator comprising:
   a first amplifier that drives a first transistor connected between a power supply and a load;
   a second amplifier that drives a second transistor connected in parallel to the first transistor;
   an amplifier control circuit that controls whether or not operation of the first amplifier is possible according to the load; and
   a first overcurrent protection circuit that limits a first output current flowing in the first transistor to a first overcurrent set value or smaller, wherein
   the first overcurrent protection circuit carries out variable control of the first overcurrent set value according to a second output current flowing in the second transistor.

2. The series regulator according to claim 1, wherein
the first overcurrent protection circuit lowers the first overcurrent set value to a larger extent when the second output current is larger, and raises the first overcurrent set value to a larger extent when the second output current is smaller.

3. The series regulator according to claim 1, wherein
current capability of the second transistor has power supply dependence or temperature dependence.

4. The series regulator according to claim 1, further comprising:
a second overcurrent protection circuit that limits the second output current to a second overcurrent set value or smaller.

5. The series regulator according to claim 4, wherein
the second overcurrent set value has power supply dependence or temperature dependence.

6. The series regulator according to claim 1, wherein
the first overcurrent protection circuit includes
   a sense voltage generating unit that generates a sense voltage according to the first output current, and
   a drive signal limiting unit that imposes limitation on a drive signal of the first transistor according to a difference value between the sense voltage and an overcurrent set voltage, and
an offset according to the second output current is given to at least one of the sense voltage and the overcurrent set voltage.

7. The series regulator according to claim 6, wherein
the sense voltage generating unit carries out current/voltage conversion of a total current of a first sense current according to the first output current and a second sense current according to the second output current to generate the sense voltage.

8. The series regulator according to claim 1, wherein
current capability of the second transistor is lower than current capability of the first transistor, and
current consumption of the second amplifier is lower than current consumption of the first amplifier.

9. The series regulator according to claim 1, wherein
the first amplifier and the second amplifier respectively drive the first transistor and the second transistor in such a manner that an output voltage applied to the load corresponds with a target value.

10. Electronic equipment comprising:
a series regulator including
   a first amplifier that drives a first transistor connected between a power supply and a load,
   a second amplifier that drives a second transistor connected in parallel to the first transistor,
   an amplifier control circuit that controls whether or not operation of the first amplifier is possible according to the load, and
   a first overcurrent protection circuit that limits a first output current flowing in the first transistor to a first overcurrent set value or smaller,
   the first overcurrent protection circuit carrying out variable control of the first overcurrent set value according to a second output current flowing in the second transistor; and
a load that receives power supply from the series regulator and operates.

* * * * *